United States Patent
Finkbeiner et al.

(10) Patent No.: US 7,096,831 B2
(45) Date of Patent: Aug. 29, 2006

(54) THERMOSTATIC VALVE FOR A COOLING SYSTEM OF AN INTERNAL COMBUSTION ENGINE

(75) Inventors: Hansjörg Finkbeiner, Weilheim (DE); Harald Gellner, Marbach (DE); Telse Hollander, Stuttgart (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 11/127,806

(22) Filed: May 12, 2005

(65) Prior Publication Data
US 2005/0268866 A1 Dec. 8, 2005

Related U.S. Application Data

(63) Continuation-in-part of application No. PCT/EP03/11521, filed on Oct. 17, 2003.

(30) Foreign Application Priority Data
Nov. 16, 2002 (DE) .................. 102 53 469

(51) Int. Cl.
*F01P 7/14* (2006.01)
(52) U.S. Cl. ................................. 123/41.1
(58) Field of Classification Search .......... 123/41.1
See application file for complete search history.

(56) References Cited

U.S. PATENT DOCUMENTS

| 3,851,629 | A |   | 12/1974 | Mayr |   |
|---|---|---|---|---|---|
| 4,964,371 | A |   | 10/1990 | Maeda |   |
| 5,482,010 | A | * | 1/1996 | Lemberger et al. | 123/41.1 |
| 2001/0019081 | A1 | * | 9/2001 | Mabboux et al. | 236/34.5 |
| 2002/0007806 | A1 | * | 1/2002 | Chamot et al. | 123/41.1 |
| 2002/0053325 | A1 |   | 5/2002 | Fishman |   |

FOREIGN PATENT DOCUMENTS

| DE | 32 02 817 | 7/1986 |
| DE | 40 22 731 A1 | 1/1992 |
| DE | 41 21 379 A1 | 1/1992 |
| DE | 40 40 323 A1 | 6/1992 |
| DE | 42 33 913 A1 | 4/1994 |
| DE | 43 30 215 A1 | 3/1995 |
| DE | 295 05 992.3 | 7/1995 |
| DE | 44 26 435 A1 | 2/1996 |
| DE | 195 23 610 A1 | 1/1997 |
| DE | 196 06 202 A1 | 8/1997 |
| DE | 195 37 068 A1 | 10/1997 |
| DE | 199 56 893 A1 | 5/2001 |
| DE | 100 55 987 A1 | 5/2002 |
| DE | 100 61 546 A1 | 8/2002 |
| DE | 102 06 359 A1 | 9/2003 |
| EP | 0 767 299 A2 | 4/1997 |
| EP | 1 132 590 A1 | 9/2001 |
| EP | 1 174 603 A1 | 1/2003 |
| FR | 1.365.149 | 8/1963 |

* cited by examiner

*Primary Examiner*—Noah P. Kamen
(74) *Attorney, Agent, or Firm*—Klaus J. Bach (57) ABSTRACT

In a thermostatic valve for a cooling system of an internal combustion engine with an inlet connection, a first outlet connection and a second outlet connection, and first, second and third valve elements for closing and opening the inlet and first and second outlet connections, at least two wax cartridge thermostats are provided for operating the valve elements and at least one of the wax cartridge thermostats is connected to an electric heating element for influencing the operation of the respective wax thermostat.

15 Claims, 11 Drawing Sheets

Prior Art

THERMOSTATIC VALVE FOR A COOLING SYSTEM OF AN INTERNAL COMBUSTION ENGINE

This is a Continuation-in-Part Application of International Application PCT/EP2003/011521 filed Oct. 17, 2003 and claiming the priority of German application 102 53 469.1 filed Nov. 16, 2002.

BACKGROUND OF THE INVENTION

The invention relates to a thermostatic valve for a cooling system of an internal combustion engine, in particular of an internal combustion engine of a motor vehicle.

Figure 1:
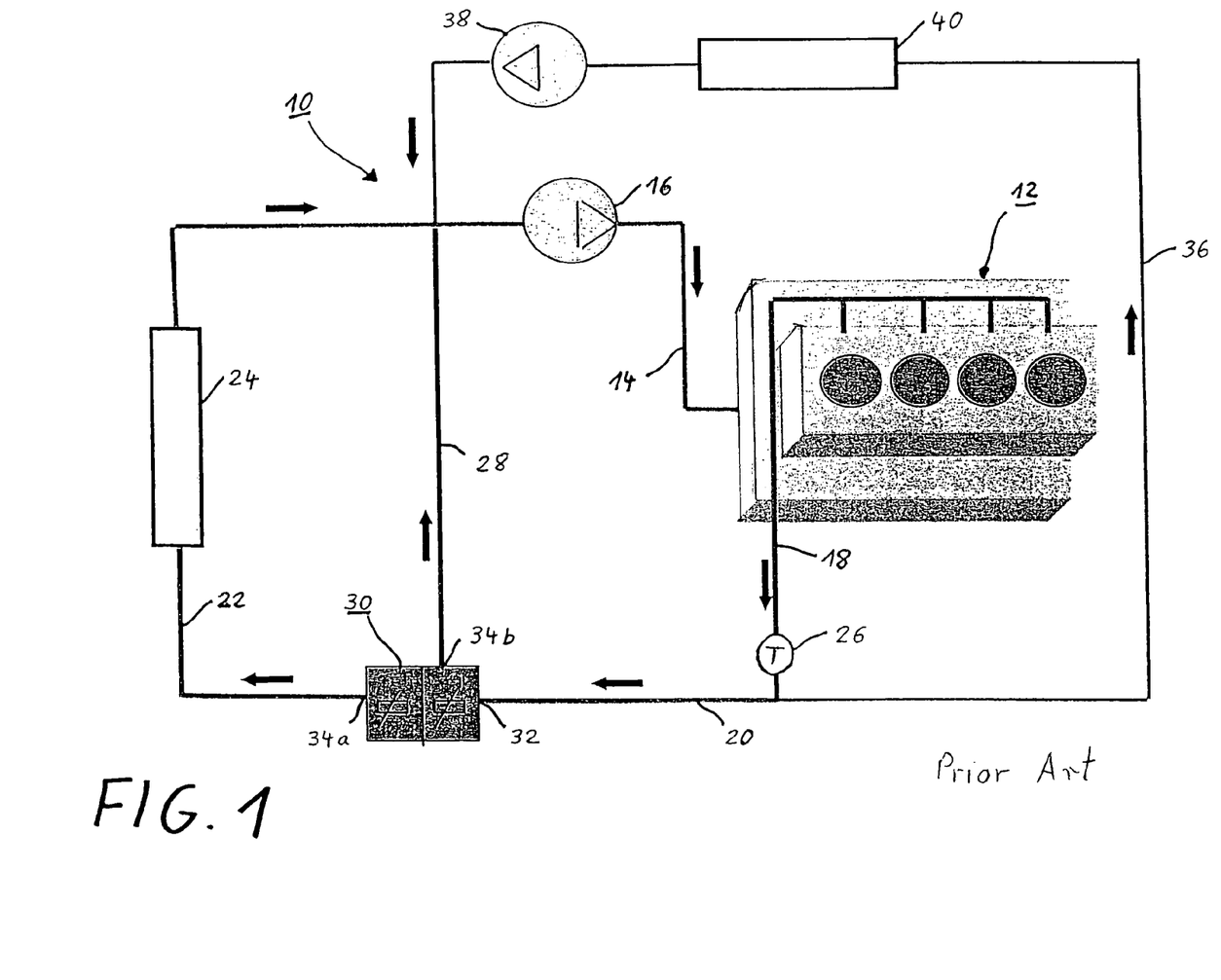
FIG. 1 shows a schematic illustration of a coolant circuit for an internal combustion engine in which the thermostatic valve according to the present invention can be used.

A cooling system for an internal combustion engine usually comprises a coolant circuit 10 in which the present invention can also be used and which is schematically illustrated in FIG. 1.

The coolant, for example water, is fed to the internal combustion engine 12 via a coolant feed line 14 by means of a pump 16. After the coolant has passed through the internal combustion engine 12 and correspondingly has been heated up owing to an exchange of heat, it flows via a coolant discharge line 18, a coolant return line 20 and a coolant radiator line 22 to a radiator 24 in order to be cooled again in said radiator by means of an exchange of heat with cooling air. The coolant which is cooled in this way is then fed back from the radiator 24 to the internal combustion engine 12 via the feed line 14.

If the temperature of the coolant flowing out of the internal combustion engine 12, which is sensed by a suitable temperature sensor 26 in the discharge line 18, for example during the warm-up phase of the internal combustion engine, is relatively low after startup of the internal combustion engine and it is not necessary to cool the coolant, the coolant is fed back directly to the feed line 14 via a coolant bypass line 28 without running through the radiator 24. The coolant thus arrives back at the internal combustion engine 12 without being cooled so that it is successively heated until it reaches a temperature which requires cooling. The coolant is therefore then directed through the radiator 24.

Usually a thermostatic valve 30 is provided for directing the coolant from the return line 20 into the radiator line 22 and/or the bypass line 28. The thermostatic valve 30 controls the opening and closing of a first passage from an inlet connection 32 which is connected to the return line 20, to a first outlet connection 34a which is connected to the radiator line 22, and of a second passage from the inlet connection 32 to a second outlet connection 34b which is connected to the bypass line 28. The control is carried out as a function of the temperature of the coolant sensed at the outlet of the internal combustion engine 12 by the temperature sensor 26.

Furthermore, the coolant which is heated in the internal combustion engine 12 can also be used to heat a passenger compartment of a motor vehicle. For this purpose, the coolant circuit 10 has a coolant heater line 36 which branches off from the discharge line 18 and by means of which the coolant is carried to a heat exchanger 40 by means of a pump 38. In the heat exchanger 40, the warm coolant exchanges heat with an air stream which is blown into the passenger compartment. The coolant is cooled as a result of heat being transferred to the air stream of the heating system of the passenger compartment. The coolant which is cooled in this way is then fed back to the feed line 14.

In order to heat the passenger compartment when the internal combustion engine 12 is stationary, an additional heater (referred to as a stationary-vehicle heater, not illustrated) may optionally be provided, said heater being connected to the heat exchanger 40 in parallel with the coolant circuit 10.

For example, what is referred to as a rotary slide thermostatic valve, whose method of operation and switched states are illustrated schematically in FIGS. 2A to 2D is known from the prior art as a thermostatic valve 30 for regulating the temperature of the coolant which is fed to the internal combustion engine 12.

As illustrated in the Figures, the rotary slide thermostatic valve 30 has a valve chamber 42 which has the inlet connection 32 in the axial direction and the first and second outer connections 34a, 34b in the radial direction. A rotary slide 44 which can rotate about the axis which is perpendicular to the plane of the drawing is provided in the chamber 42, said rotary slide 44 being constructed with two closure areas and two opening areas in such a way that the switched states described below can be set.

Figure 2A:
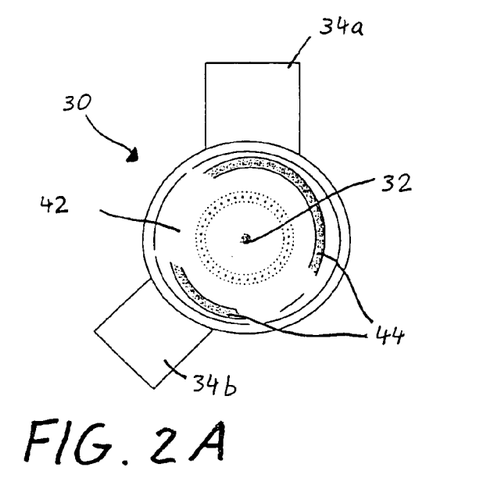
FIGS. 2A to 2D show four different switched states of an example of a conventional rotary slide thermostatic valve which can be used in the coolant circuit in FIG. 1.

In the first switched state of the thermostatic valve 30, which is illustrated in FIG. 2A, for the purpose of what is referred to as full throttle, the rotary slide 44 is placed in such a rotary position that both the first and second outlet connections 34a, 34b are closed. As a result, the coolant is prevented from circulating and the coolant is stationary, inter alia also in the internal combustion engine 12, where it consequently heats up. The warming-up of the internal combustion engine 12 can be promoted by this full throttle.

Figure 2B:
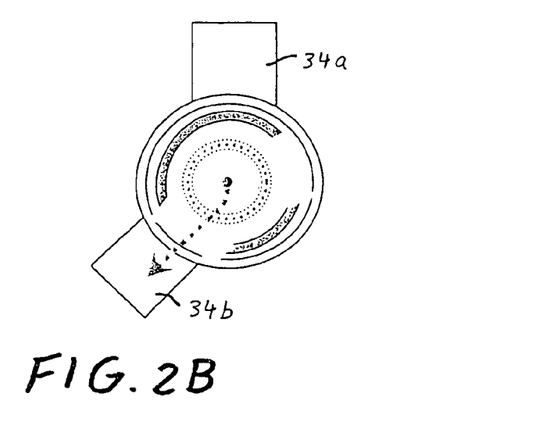
Figure 2C:
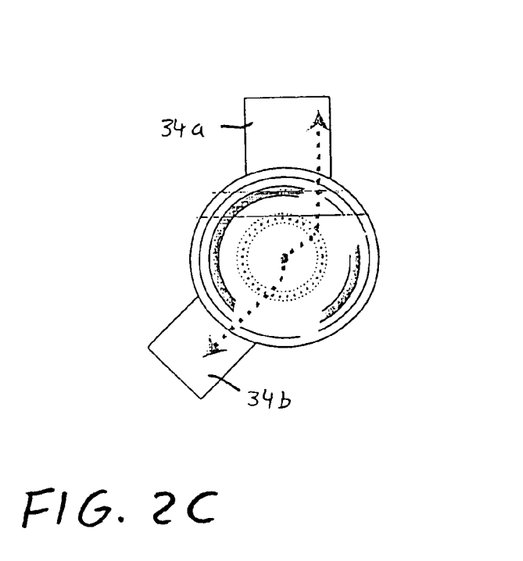
Figure 2D:
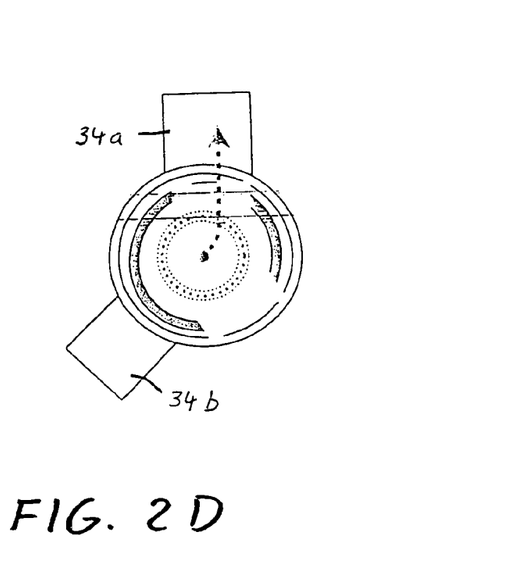

In the warm-up operating mode of the internal combustion engine 12, the second outlet connection 34b is cleared by the rotary slide 44, while the first outlet connection 34a remains closed, as illustrated in FIG. 2B. In this way, the coolant is returned to the internal combustion engine 12 only via the bypass line 28 so that it gradually heats up.

As the temperature of the coolant rises, partial cooling of the coolant becomes necessary so that the thermostatic valve 30 is switched into the mixed operating mode. In this mixed operating mode, the rotary slide 44 is in such a rotary position that both outlet connections 34a and 34b are opened (see FIG. 2C) so that part of the coolant flows through the radiator 24 and the other part is fed back directly to the internal combustion engine 12.

When there is a maximum demand for cooling capacity, the first outlet connection 34a is fully opened and the second outlet connection 34b is closed (cooling operating mode according to FIG. 2D) so that all of the coolant is directed through the radiator 24 for the purpose of cooling.

The operating positions of the rotary slide thermostatic valve 30 can be set quickly and precisely by means of a suitable electromechanical control system, and the rotary position of the rotary slide 44 can also be sensed electronically. The high costs of such a rotary slide thermostatic valve, in particular for controlling it, as well as its heavy weight and its large size are disadvantageous.

An object of the present invention is to provide a thermostatic valve for a cooling system of an internal combustion engine, with which the switched states of a rotary slide thermostatic valve can be set and the switching times are as short as possible. Furthermore, the thermostatic valve should be as small as possible and as lightweight as possible and it should also be inexpensive.

SUMMARY OF THE INVENTION

In a thermostatic valve for a cooling system of an internal combustion engine with an inlet connection, a first outlet connection and a second outlet connection, and first, second and third valve elements for closing and opening the inlet and first and second outlet connections, at least two wax cartridge thermostats are provided for operating the valve elements and at least one of the wax cartridge thermostats is connected to an electric heating element for influencing the operation of the respective wax thermostat.

With this thermostatic valve it is possible to reset the switched states of a rotary slide thermostatic valve described at the beginning, and even the switched state of full throttle in the preferred embodiments of the invention. By providing the thermostatic valve with a wax cartridge thermostat it is possible to implement a more cost-effective design with a smaller size and a lower weight than with a rotary slide thermostatic valve. Since the temperature acting on the wax cartridge thermostat can be increased by the electric heating element, the switched state of the thermostatic valve can be set more quickly and at a lower coolant temperature. This is advantageous in particular where there are sudden load changes of the internal combustion engine which would otherwise give rise to an excessively large increase in the temperature of the coolant.

In one embodiment of the invention, the electric heating element can be controlled as a function of at least one parameter which is a measure of the load of the internal combustion engine. In particular, this parameter is selected from the group composed of the temperature of the coolant, the temperature of the thermostatic valve, the temperature of the internal combustion engine, the injection quantity of the internal combustion engine, the torque of the internal combustion engine and the position of the accelerator pedal.

In a refinement of the invention, the thermostatic valve is also provided with a coolant bypass passage between the inlet connection and the second outlet connection of the coolant bypass line. This measure ensures that the wax cartridge thermostat of the thermostatic valve of the invention is continuously contacted by the coolant irrespective of the switched state of the thermostatic valve, therefore permitting more precise control of the switched states with shorter switching times.

In a further refinement of the invention, the first and second valve elements are biased, by means of restoring springs, into a position in which the passage between the inlet connection and the first outlet connection or the passage between the inlet connection and the second outlet connection is closed.

Figure 3A:
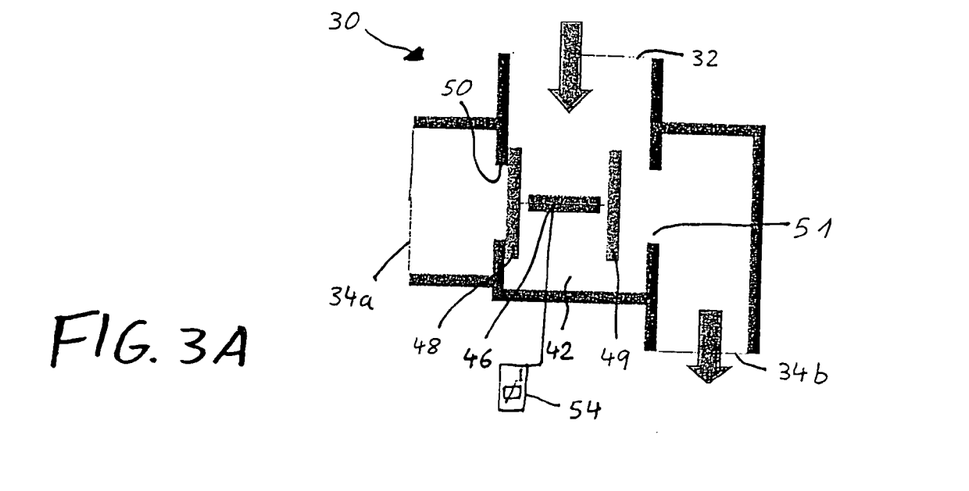
FIGS. 3A to 3C show three different switched states of a first exemplary embodiment of a thermostatic valve with two valve disks and a wax cartridge thermostat on a common axis according to the present invention, which thermostatic valve can be used in the coolant circuit in FIG. 1.
Figure 3B:
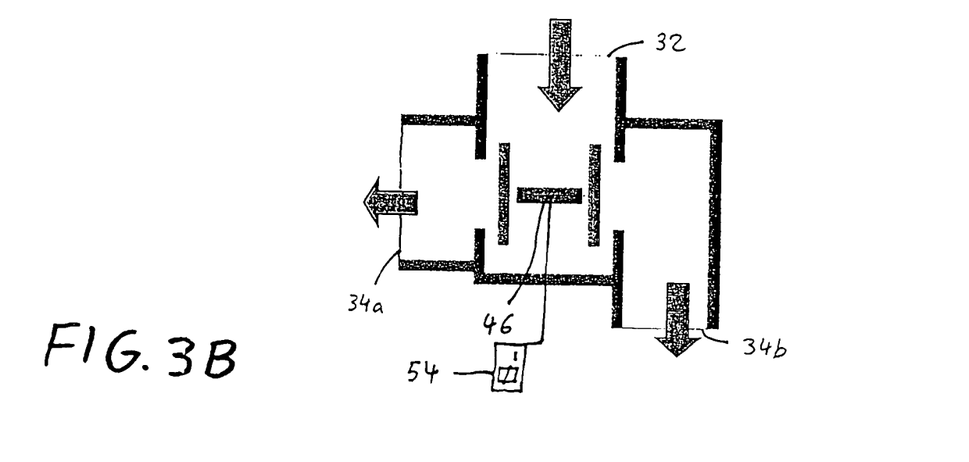
Figure 3C:
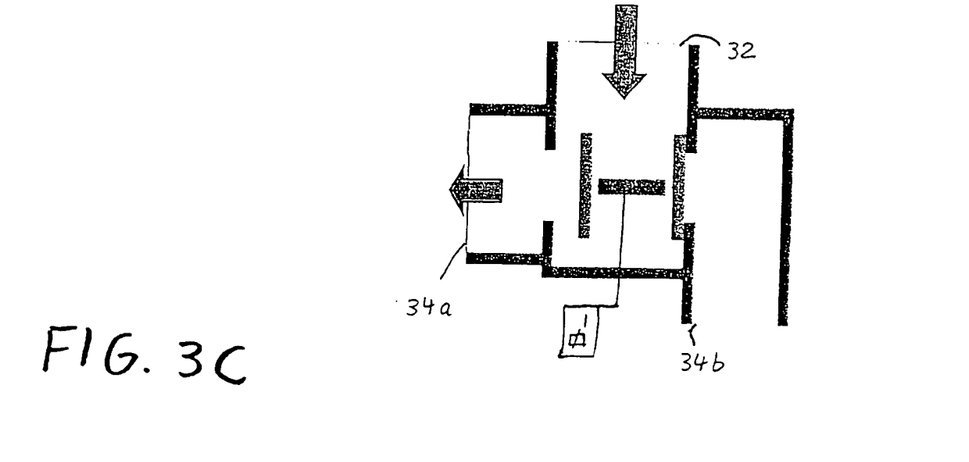

According to one preferred embodiment of the invention, the first and second valve elements are arranged on a common axis. In this context, the wax cartridge thermostat can be arranged between the first and second valve elements (embodiment in FIG. 3).

The first valve element can optionally be composed of a first valve disk for opening and closing the first passage, and the second valve element can optionally be composed of a second valve disk and a third valve disk which close and open the second passage alternately. A wax cartridge thermostat is arranged between the first valve disk and the second valve disk, and the second passage can be opened by the pressure of the coolant (embodiment in FIG. 5).

In one alternative refinement of the single-axis design a first and a second wax cartridge thermostat are provided which contain wax materials with different temperature coefficients, wherein the first wax cartridge thermostat acts on the first valve element, and the second wax cartridge thermostat acts on the second valve element, and the first and second wax cartridge thermostats operate independently of one another.

In this case, the first valve element can be composed of a first valve disk for opening and closing the first passage, and the second valve element can be composed of a second valve disk for opening and closing the second passage, wherein the first and second wax cartridge thermostats are arranged one behind the other between the first valve disk and the second valve disk (embodiment in FIG. 6), or the first valve element is composed of a first valve disk for opening and closing the first passage, and the second valve element is composed of a second valve disk and a third valve disk which close and open the second passage alternately. Then, the first wax cartridge thermostat is arranged between the first valve disk and the second valve disk, and the second wax cartridge thermostat is arranged between the second and third valve disks (embodiment in FIG. 4).

However, with the single-axis design of the thermostatic valve it is also possible for the first wax cartridge thermostat to act on the first valve element, and the second wax cartridge thermostat to act on the second valve element, in such a way that the first and second wax cartridge thermostats are coupled in opposition to one another (embodiment in FIG. 8).

According to a further preferred embodiment of the invention, the first and second valve elements are arranged on two different axes, and a first and a second wax cartridge thermostat are provided which contain wax materials with different temperature coefficients.

With this two-axis design of the thermostatic valve, the first wax cartridge thermostat can act on the first valve element, and the second wax cartridge thermostat can act on the second valve element, wherein the first and second wax cartridge thermostats operate independently of one another (embodiment in FIG. 7).

Alternatively, with this two-axis design of the thermostatic valve, the first valve element can also be composed of a second valve disk which closes the first outlet connection and of a first valve disk which closes the inlet connection and the second valve element can be composed of a third valve disk which closes the second outlet connection and of the first valve disk which closes the inlet connection; and the second wax cartridge thermostat can act on the second and third valve disks in opposition, and the first wax cartridge thermostat can act on the first valve disk (embodiment in FIG. 9).

Further advantages, features and feature combinations result from the description and the drawings. Specific exemplary embodiments of the invention are illustrated in simplified form in the drawings and explained in more detail in the following description.

DESCRIPTION OF EXEMPLARY
EMBODIMENTS OF THE INVENTION

Various exemplary embodiments of a thermostatic valve according to the present invention and their methods of operation will be explained in more detail below with reference to FIGS. 3 to 9. The thermostatic valves can all be used in a coolant circuit such as has been described with reference to FIG. 1, or a similar cooling system of internal combustion engines. The cooling system in FIG. 1 will not be described once more in order to avoid unnecessary repetitions at this point. Similar or correspondingly acting components have been labeled with the same reference numbers in all the figures.

The thermostatic valve 30 according to the first exemplary embodiment which is illustrated in FIG. 3 contains a valve chamber 42 which can be connected to the coolant return line 20 via an inlet connection 32 (see FIG. 1), to the coolant radiator line 22 via a first outlet connection 34a, and to the coolant bypass line 28 via a second outlet connection 34b. A wax cartridge thermostat 46 is arranged in the valve chamber 42, said wax cartridge thermostat 46 acting on a first valve disk 48 as a first valve element for closing a first passage opening 50 from the valve chamber 42 to the first outlet connection 34a, and on a second valve disk 49 as a second valve element for closing a second passage opening 51 leading to the second outlet connection 34b. Since the design and the method of operation of a wax cartridge thermostat are basically known to a person skilled in the art, a more detailed description thereof will not be given here.

The first and second valve elements 48, 49 and the wax cartridge thermostat 46 are arranged on a common axis, as is apparent in FIG. 3. In addition, the wax cartridge thermostat 46 is connected or coupled to an electric heating element 54. The electric heating element 54 can, when necessary, increase the temperature of the wax cartridge thermostat 46 and at the same time speed up the switching process of the thermostatic valve 30 or cause switching at a lower coolant temperature. The electric heating element 54 can be controlled here as a function of at least one parameter which is a measure of the load on the internal combustion engine. Examples of such a parameter are the temperature of the coolant, the temperature of the thermostatic valve, the temperature of the internal combustion engine, the fuel injection quantity of the internal combustion engine and the position of the accelerator pedal. FIG. 3A is a schematic view of the bypass operating mode of the wax cartridge thermostatic valve 30 in which the first passage opening 50 is closed and the second passage opening 51 is open in a temperature range $T < T_y$ so that the coolant which is supplied by the return line 20 is directed exclusively to the bypass line 28 which is connected to the second outlet connection 34b. When a coolant temperature $T_y$ is reached, or if the electric heating element 54 is activated, the thermostatic valve 30 changes to the switched state of the mixed operating mode shown in FIG. 3B as soon as a temperature $T_y$–$T_2$ is reached. Here, both outlet connections 34a and 34b are connected to the valve chamber 42 and thus to the inlet connection 32 so that the stream of coolant is divided between the radiator line 22 and the bypass line 28 in accordance with the temperature of the coolant. When the temperature of the coolant is even higher, i.e. when a coolant temperature $T_z$ is reached, or if the electric heating element 54 is activated, the second outlet connection 34b is closed by the wax cartridge thermostat 46 as soon as a temperature $T_z$–$T_3$ is reached, so that the entire coolant is supplied to the radiator 24 in order to achieve a maximum cooling capacity of the coolant circuit 10.

The thermostatic valve 30 (illustrated in FIG. 3) with a wax cartridge thermostat is capable of resetting all the switched states of the conventional rotary slide thermostatic valve including the switched state of full throttling (illustrated in FIG. 2A) in order to heat up the internal combustion engine more quickly. In addition, a high switching speed of the thermostatic valve is achieved and the thermostatic valve of the invention is smaller and lighter in weight and entails lower manufacturing costs than the conventional rotary slide thermostatic valve.

So that full throttling can also be set with a wax cartridge thermostat as in a rotary slide thermostatic valve, a second exemplary embodiment of a thermostatic valve 30 is also proposed with three valve disks and two wax cartridge thermostats, as illustrated in FIGS. 4A to 4D.

Figure 4A:
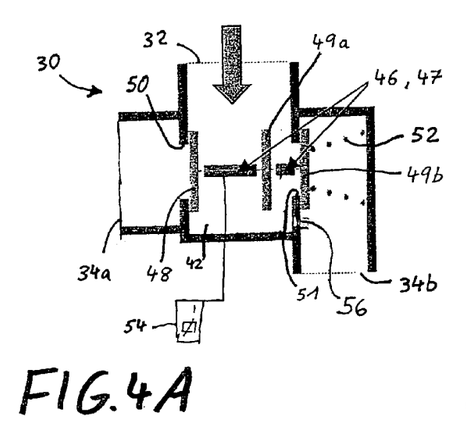
FIGS. 4A to 4D show four different switched states of a second exemplary embodiment of a thermostatic valve with three valve disks and two wax cartridge thermostats on a common axis according to the present invention.
Figure 4B:
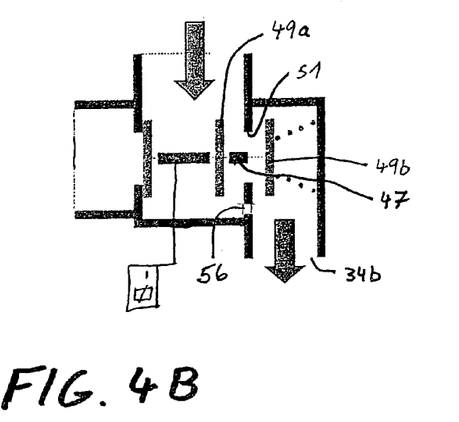
Figure 4C:
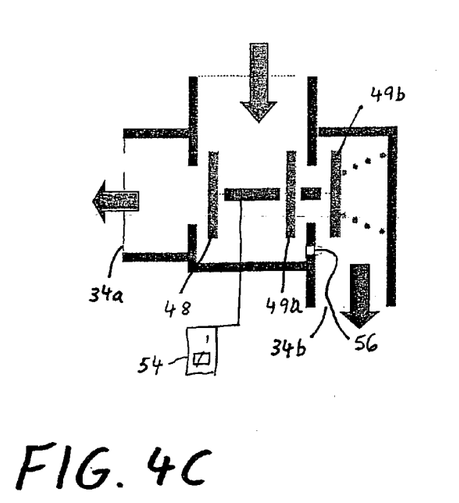
Figure 4D:
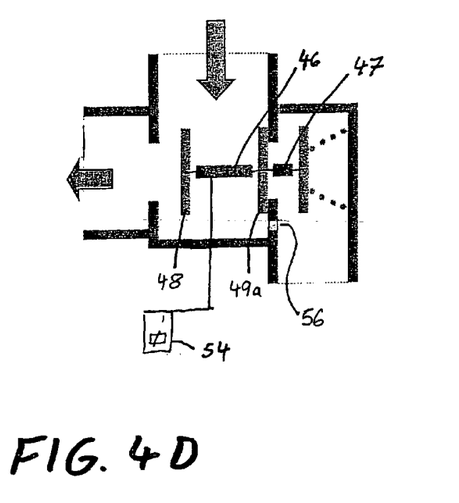

This thermostatic valve 30 also has a valve chamber 42 which is connected, on the one hand, to the inlet connection 32 leading to the coolant return line 20 and, on the other hand, via a first passage opening 50, to the first outlet connection 34a leading to the coolant radiator line 22, and, via a second passage opening 51, to the second outlet connection 34b leading to the bypass line 28. The first passage opening 50 can be closed by means of a first valve disk 48 which forms a first valve element, while the second passage opening 51 can alternately, be closed by means of a second valve disk 49a and a third valve disk 49b which form a second valve element, with the third valve disk 49b being biased into its closed position by means of a restoring spring 52. A first wax cartridge thermostat 46 which is connected to an electric heating element 54 is arranged between the first and second valve disks 48 and 49a. A second wax cartridge thermostat 47 which is not coupled to an electric heating element, but could be, is arranged between the second valve disk 49a and the third valve disk 49b. The two wax cartridge thermostats 46, 47 also contain wax materials with different coefficients of thermal expansion A small by-pass opening 56 is provided to permit a limited coolant flow through the thermostatic valve 30 when both of the valve disks 48 and 49b are in the closed position to ensure exposure of the way cartridge thermostats 46, 47 to the proper coolant temperature. With this arrangement, the following method of operation is achieved:

At a very low temperature full throttling occurs by the first passage opening 50 leading to the first outlet connection 34a being closed by the first valve disk 48, and the second passage opening 51 leading to the second outlet connection 34b being closed by the third valve disk 49b by means of the restoring spring 52 (FIG. 4A). In the bypass operating mode of the thermostatic valve 30 for warming up the internal combustion engine 12, the second passage opening 51 is opened by the third valve disk 49b being pressed away from the second passage opening 51 by the second wax cartridge thermostat 47 counter to the force of the restoring spring 52, as shown in FIG. 4B. The coolant from the return line 20 is thus fed exclusively to the bypass line 28. At higher temperatures of the coolant which require the coolant to be cooled, the thermostatic valve 30 is switched into the position of the mixed operating mode which is illustrated in FIG. 4C. In this operating position, the first valve disk 48 is lifted off from the first passage opening 50 leading to the first outlet connection 34a by the first wax cartridge thermostat 46, the second valve disk 49a is moved only partially in the direction of the second passage opening 51, and the third valve disk 49b remains in the previously opened position. In this way, both the first passage opening 50 and the second passage opening 51 are opened by corresponding interaction between the two wax cartridge thermostats 46 and 47. If the maximum cooling capacity of the coolant circuit 10 is necessary at very high coolant temperatures, the second valve disk 49a is pressed against the second passage opening 51 in order to close it, while the first passage opening 50 leading to the first outlet connection 34a connected to the radiator line 22 remains open, as can be seen in FIG. 4D.

Basically all the switched states of the rotary slide thermostatic valve in FIG. 2 can be subsequently set by the thermostatic valve 30 with two wax cartridge thermostats which is explained with reference to FIG. 4. In addition, short switching times are possible with the wax cartridge thermostat 46 as a result of the connection to the electric heating element 54.

If the coolant circuit 10 has a coolant pump 16 which can be switched off, a variant of the second exemplary embodiment which is illustrated in FIG. 5 is preferred. The structural difference with respect to the thermostatic valve in FIG. 5 in comparison with that in FIG. 4 is the omission of the second wax cartridge thermostat 47. The method of operation of this thermostatic valve 30 is as follows.

Figure 5A:
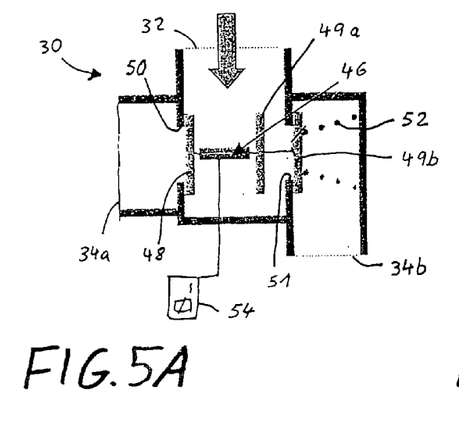
FIGS. 5A to 5D show four different switched states of a variant of the second exemplary embodiment of a thermostatic valve in FIG. 4 with three valve disks and a wax cartridge thermostat on a common axis.
Figure 5B:
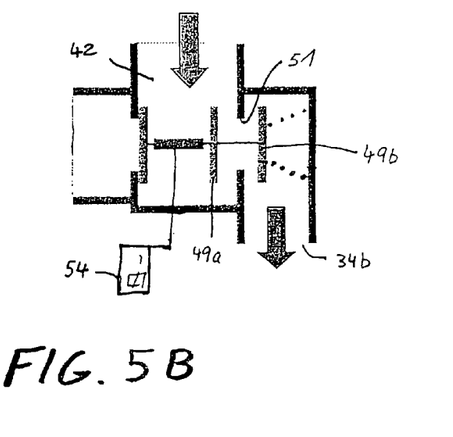
Figure 5C:
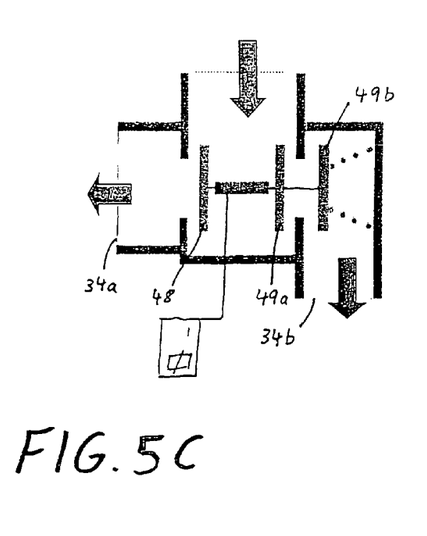
Figure 5D:
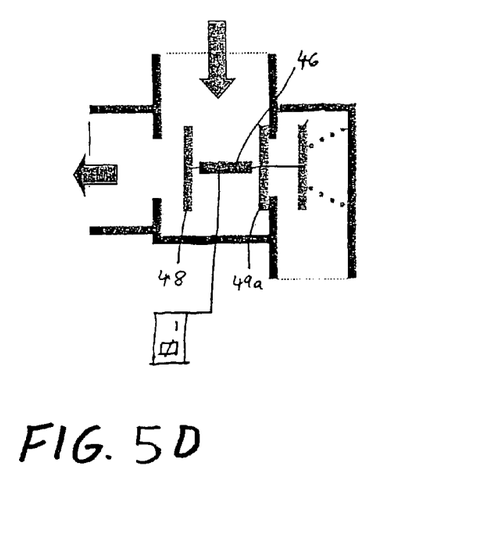

If the coolant is at a very low temperature and the coolant pump 16 is not operating, full throttling occurs by the first' passage opening 50 leading to the first outlet connection 34a being closed by the first valve disk 48 and the second passage opening 51 leading to the second outlet connection 34b being closed by the third valve disk 49b by means of the restoring spring (FIG. 5A). As soon as the coolant pump 16 operates and feeds coolant, and thus builds up a pressure, the third valve disk 49b is pressed on counter to the force of the restoring spring 52. In the bypass operating mode of the thermostatic valve 30 for warming up the internal combustion engine 12, the second passage opening 51 is thus opened by the third valve disk 49b being pressed away from the second passage opening 51 by the pressure of the coolant, counter to the small force of the restoring spring 52, as shown in FIG. 5B. As soon as the coolant pump 16 is operational, the thermostatic valve 30 illustrated functions in an analogous way to the first exemplary embodiment illustrated in FIG. 3.

The thermostatic valve 30 according to the third exemplary embodiment which is illustrated in FIG. 6 contains a valve chamber 42 which can be connected to the coolant return line 20 via an inlet connection 32 (see FIG. 1), to the coolant radiator line 22 via a first outlet connection 34a, and to the coolant bypass line 28 via a second outlet connection 34b. The inlet connection 32 is connected to the first outlet connection 34a via a first passage composed of the valve chamber 42 and a first passage opening 50. In addition, the inlet connection 32 is connected to the second outlet connection via a second passage composed of the valve chamber 42 and two second passage openings 51, 51'.

The thermostatic valve 30 also has a first and a second valve element. The first valve element is formed by a first valve disk 48 which opens and closes the first passage opening 50 and which is biased into the closed position against the first passage opening 50 by a first restoring spring 52a. The second valve element is formed by a second valve disk 49 which alternately opens and closes the two second passage openings 51, 51' and which is biased into the closed position against the second passage opening 51 by a second restoring spring 52b. As is apparent in FIG. 6, the two valve elements 48 and 49 are arranged on a common axis.

In the valve chamber 42, a first wax cartridge thermostat 46 and a second wax cartridge thermostat 47 are also provided and they are arranged in a row between the first and second valve disks 48, 49. The two wax cartridge thermostats contain wax materials with different coefficients of thermal expansion so that the switched states described below can be set. In addition, the first wax cartridge thermostat 46 is connected to a first electric heating element 54, and the second wax cartridge thermostat 47 is connected to a second electric heating element 55.

The two electric heating elements 54, 55 can, when necessary, increase the temperatures of the wax cartridge thermostats 46, 47, and as a result, speed up the switching process of the thermostatic valve 30 or provide for the switching process at a lower coolant temperature. The electric heating elements 54, 55 can be controlled as a function of at least one parameter which is a measure of the load on the internal combustion engine. Examples of such a parameter are the temperature of the coolant, the temperature of the thermostatic valve, the temperature of the internal combustion engine, the fuel injection quantity of the internal combustion engine, the torque of the internal combustion engine and the position of the accelerator pedal.

Furthermore, the thermostatic valve 30 is provided with a bypass passage 56 by way of which coolant can bypass the second passage, opening 51 in the exemplary embodiment in FIG. 6 if said passage opening 51 is closed by the second valve disk 49. This measure ensures that coolant flows around the two wax cartridge thermostats 46 and 47 in all the switched states of the thermostatic valve 30, thus permitting precise control with short switching times, as is apparent in FIGS. 6A to 6D.

Figure 6A:
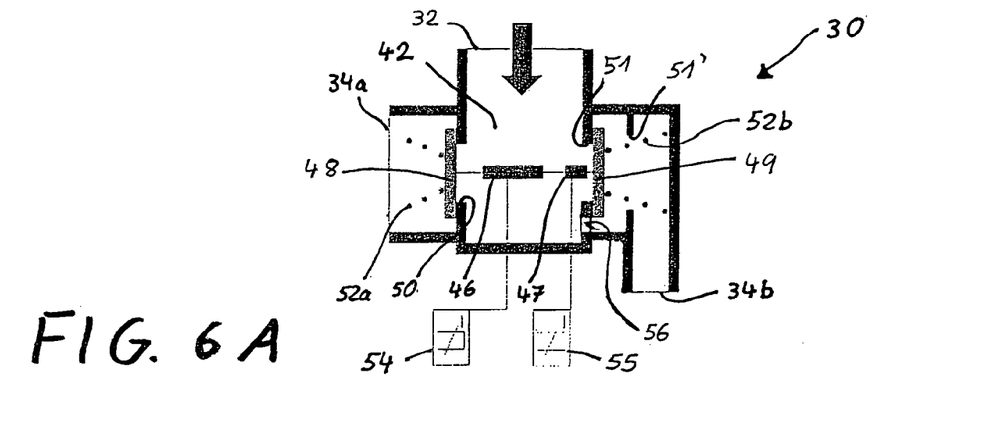
FIGS. 6A to 6D show four different switched states of a third exemplary embodiment of a thermostatic valve with two valve disks and two wax cartridge thermostats on a common axis according to the present invention.
Figure 6B:
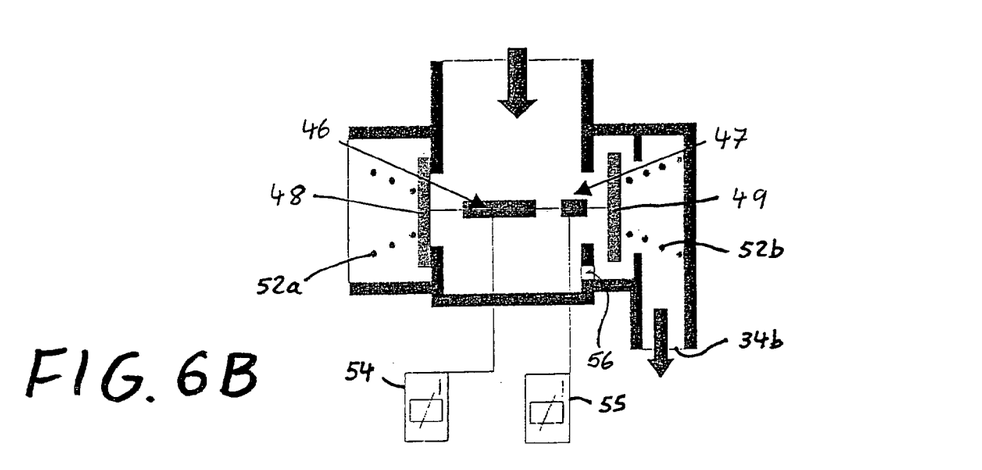

In a first temperature range $T<T_x$, the thermostatic valve 30 is in the switched state of full throttling, which is illustrated in FIG. 6A. In this switched state, the two wax cartridge thermostats 46, 47 act on the valve elements in such a way that the first valve disk 48 is pressed against the first passage opening 50 by the force of the first restoring spring 52a in order to close the first passage, and that the second valve disk 49 is pressed against the front passage opening 51 of the two second passage openings by the force of the second restoring spring 52b, in order to close the second passage.

If a coolant temperature $T_x$ is reached or if the electric heating elements 54, 55 are activated, the thermostatic valve 30 changes to the switched state of the bypass operating mode (illustrated in FIG. 6B) as soon as a coolant temperature $T_x-T_l$ is reached. In the second temperature range $T_x<T<T_y$, the wax is expanded to a varying degree in such a way that the activation elements of the two wax cartridge thermostats 46, 47 act on the valve elements 48, 49. As a result, the axial position of the two wax cartridge thermostats 46, 47 in the valve chamber 42 is changed in such a way, that even though the force on the first valve disk 48 is still insufficient to open the first passage opening 50 in order to overcome the force of the first restoring spring 52a, the one second passage opening 51 is opened by pressing away the second valve disk 49 counter to the force of the second restoring spring 52b. In this way, the second passage of the thermostatic valve 30 is opened and the coolant can flow from the return line 20 out of the second outlet connection 34b and to the bypass line 28.

Figure 6C:
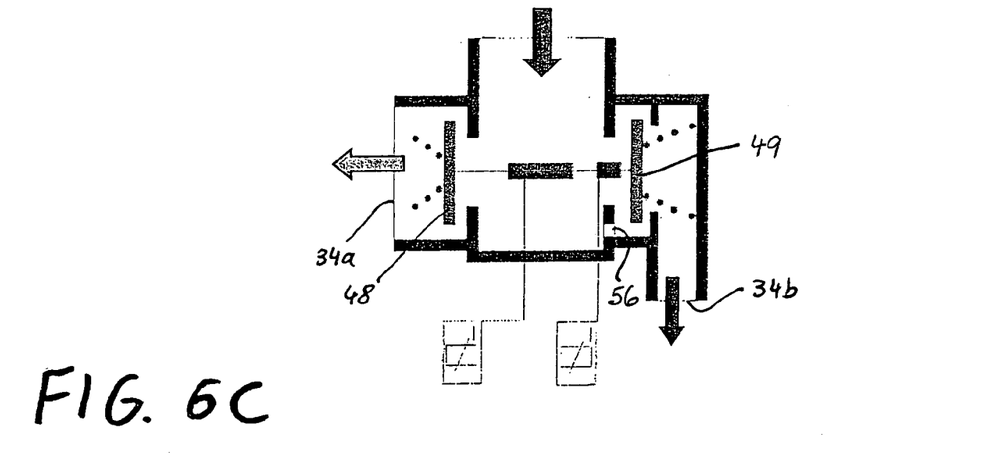

If a coolant temperature $T_y$ is reached or if the electric heating elements 54, 55 are activated, the thermostatic valve 30 changes into the switched state of the mixed operating mode shown in FIG. 6C as soon as a coolant temperature $T_y$-$T_2$ is reached. In the third temperature range $T_y<T<T_z$, the wax is expanded further to differing degrees in such a way that the activation elements of the two wax cartridge thermostats 46, 47 act on the valve elements 48, 49. As a result, the axial position of the two wax cartridge thermostats 46, 47 is changed in the valve chamber 42 in such a way, that the first valve disk 48 is now pressed away from the first passage opening 50 counter to the force of the first restoring spring 52a. Consequently, the first passage opening 50 is opened, but the force of the second wax cartridge thermostat 47 is still not sufficient to press the second valve disk 49 against the rear passage opening 51' of the two second passage openings counter to the force of the second restoring spring 52b. As a result, both the first and second passages of the thermostatic valve 30 are open and the coolant can flow from the return line 20 out of the second outlet connection 34b to the bypass line 28 and also via the first outlet connection 34a to the radiator line 22.

Figure 6D:
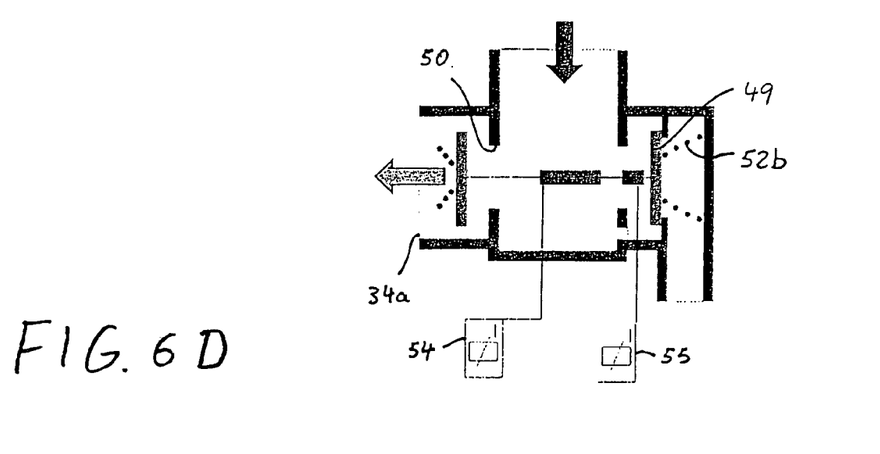

If a coolant temperature $T_z$ is reached or if the electric heating elements 54, 55 are activated, the thermostatic valve 30 changes into the switched state of the radiator operating mode in FIG. 6D for maximum cooling capacity of the coolant circuit 10 as soon as a coolant temperature $T_z$-$T_3$ is reached. In the fourth temperature range $T>T_z$, the wax is expanded to varying degrees in such a way that the activation elements of the two wax cartridge thermostats 46, 47 act on the valve elements 48, 49 in such a way, and the axial position of the two wax cartridge thermostats 46, 47 is changed in the valve chamber 42 in such a way, that the first valve disk 48 is pressed away further from the first passage opening 50a counter to the force of the first restoring spring 52, and the force on the second valve disk 49 is now sufficient to close the second passage opening 51' so as to overcome the force of the second restoring spring 52b. For this reason, only the first passage of the thermostatic valve 30 is now still open and the coolant can flow from the return line 20 exclusively from the first outlet connection 34a into the radiator line 22 leading to the radiator 24.

Depending on the installation space available for the thermostatic valve 30 to be inserted it may be appropriate to arrange the valve elements and the wax cartridge thermostats on two different axes. This is implemented in the fourth exemplary embodiment of the invention which is illustrated in FIGS. 7A to 7D.

The thermostatic valve 30 according to the fourth exemplary embodiment also contains a valve chamber 42 which can be connected to the return line 20 via an inlet connection 32, to the radiator line 22 via a first outlet connection 34a, and to the bypass line 28 via a second outlet connection 34b. The inlet connection 32 is in communication with the first outlet connection 34a via a first passage composed of the valve chamber 42 and a first passage opening 50, and with the second outlet connection 34b via a second passage composed of the valve chamber 42 and two second passage openings 51, 51'.

Furthermore, a first and a second valve element are provided. The first valve element is formed by a first valve disk 48 which opens and closes the first passage opening 50 and which is biased into the closed position against the first passage opening 50 by a first restoring spring 52a. The second valve element is formed by a second valve disk 49 which opens and closes the two second passage openings 51, 51' alternately and which is biased into the closed position against the second passage opening 51 by a second restoring spring 52b. In contrast to the third exemplary embodiment in FIG. 6, the two valve elements 48 and 49 in this second exemplary embodiment are arranged on two different axes which can be oriented, for example, in parallel with one another, as is shown clearly in FIG. 7.

A first wax cartridge thermostat 46 acts on the first valve disk 48, and independently of this a second wax cartridge thermostat 47 acts on the second valve disk 49. The two wax cartridge thermostats in turn contain wax material with different coefficients of thermal expansion so that the switched states described below can be set. Furthermore, the two wax cartridge thermostats 46, 47 are each connected to an electric heating element 54, 55 whose method of operation is in accordance with that described above on the basis of the previous exemplary embodiments. A bypass passage 56 connects the valve chamber 42 to the second outlet connection 34b bypassing the second passage openings 51, 51'.

Figure 7A:
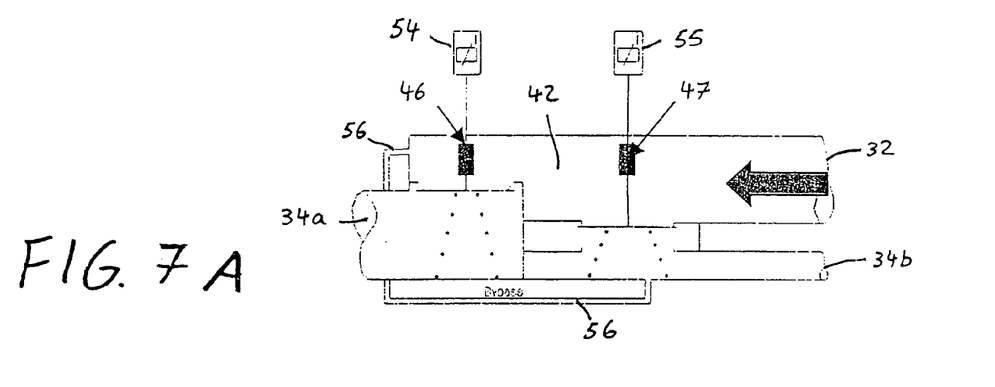
FIGS. 7A to 7D show four different switched states of a fourth exemplary embodiment of a thermostatic valve with two valve disks and two wax cartridge thermostats on two different axes according to the present invention.
Figure 7B:
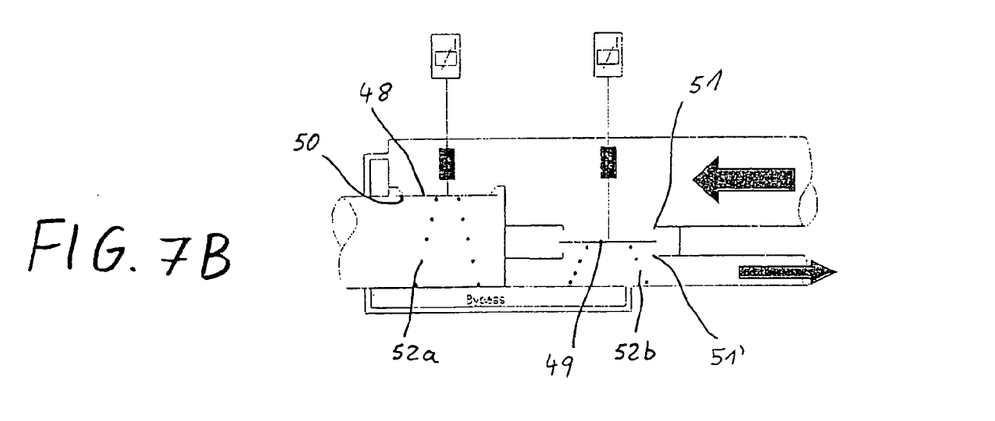

In the first temperature range $T<T_x$, the thermostatic valve 30 is in the switched state of full throttling which is illustrated in FIG. 7A, i.e. both passages are closed by the valve disks 48, 49 which are biased into this position by the respective restoring springs 52a, 52b. If the coolant temperature $T_x$ is reached or if the electric heating elements 54, 55 are activated, the thermostatic valve 30 changes into the switched state of the bypass operating mode which is illustrated in FIG. 7B as soon as a coolant temperature $T_x$-$T_1$ is reached. In the second temperature range $T_x<T<T_y$, the wax is expanded to differing degrees in such a way that the activation elements of the two wax cartridge thermostats 46, 47 act on the valve elements 48, 49 in such a way that although the force on the first valve disk 48 is still not sufficient to open the first passage opening 50 so as to overcome the force of the first restoring spring 52a, the one second passage opening 51 is opened by pressing away the second valve disk 49 counter to the force of the second restoring spring 52b. In this way, the second passage of the thermostatic valve 30 is opened and the coolant can flow from the return line 20 out of the second outlet connection 34b to the bypass line 28.

Figure 7C:
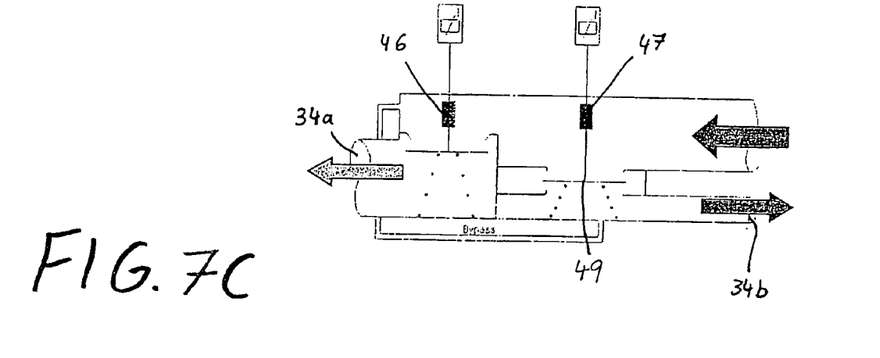
Figure 7D:
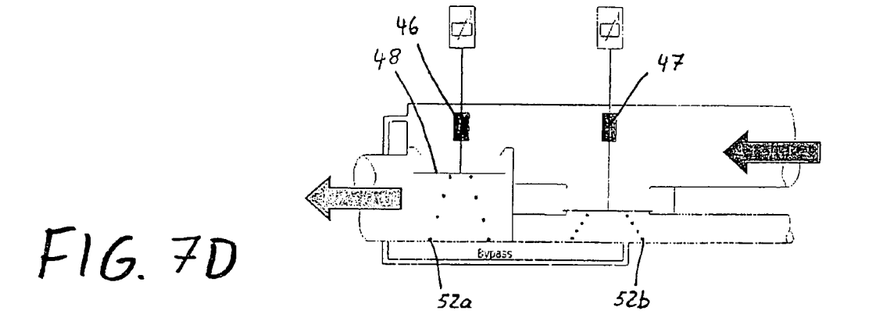

If a higher coolant temperature $T_y$ is reached or if the electric heating elements 54, 55 are activated, the thermostatic valve 30 then changes into the mixed operating mode shown in FIG. 7C as soon as a coolant temperature $T_y$-$T_2$ is reached. In the third temperature range $T_y<T<T_z$, the wax is expanded further to differing degrees in such a way that the activation elements of the two wax cartridge thermostats 46, 47 act on the valve elements 48, 49 in such a way that the first valve disk 48 is pressed away from the first passage opening 50 counter to the force of the first restoring spring 52a in order to open said passage opening 50 but the force of the second wax cartridge thermostat 47 is not yet sufficient to press the second valve disk 49 against the rear passage opening 51' of the second passage openings counter to the force of the second restoring spring 52b. As a result, both the first passage and the second passage of the thermostatic valve 30 are open and the coolant can flow from the return line 20 to the bypass line 28 and also to the radiator line 22. If a coolant temperature $T_z$ or if the electric heating elements 54, 55 are activated, the thermostatic valve 30 changes into the radiator operating mode of FIG. 7D as soon as a coolant temperature $T_z$–$T_3$ is reached. In the fourth temperature range $T > T_z$, the wax is expanded to differing degrees in such a way that the activation elements of the two wax cartridge thermostats 46, 47 act on the valve elements 48, 49 in such a way that the first valve disk 48 is pressed further away from the first passage opening 50 and the force on the second valve disk 49 is now sufficient to close the second passage opening 51' in order to overcome the force of the second restoring spring 52b. The coolant can then therefore flow from the return line 20 exclusively from the first outlet connection 34a into the radiator line 22 to the radiator 24.

The design and the method of operation of a further exemplary embodiment of a thermostatic valve 30 according to the invention will now be explained with reference to FIGS. 8A to 8D.

As in the third exemplary embodiment in FIG. 6, the two valve elements in the form of valve disks 48, 49 are arranged on a common axis and the two wax cartridge thermostats 46, 47 are positioned one behind the other between the valve disks 48, 49. In contrast to the third exemplary embodiment, the wax cartridge thermostats 46, 47 are coupled to one another in an interaction with the respective restoring springs 52a, 52b, in opposition to one another in such a way that the switched states act in the following way. Furthermore, the second passage from the inlet connection 32 to the second outlet connection 34b is formed by the valve chamber 42 and only a second passage opening 51.

In the first temperature range $T < T_x$, the switched state of full throttling occurs, as illustrated in FIG. 7A; both passages are closed by the valve disks 48, 49 which are biased into this position by the respective restoring springs 52a, 52b. If the coolant's temperature is $T_x$ or if the electric heating elements 54, 55 are activated, the switched state of the thermostatic valve 30 changes into the bypass operating mode, illustrated in FIG. 8B, as soon as a coolant temperature $T_x$–$T_1$ is reached. In the second temperature range $T_x < T < T_y$, the wax is expanded to various degrees in such a way that the activation elements of the two wax cartridge thermostats 46, 47 act on the valve elements 48, 49 in such a way, and the axial position of the two wax cartridge thermostats 46, 47 in the valve chamber 42 is changed in such a way, that although the force on the first valve disk 48 is not yet sufficient to open the first passage opening 50 so as to overcome the force of the first restoring spring 52a, the one second passage opening 51 is opened by pulling on the second valve disk 49 counter to the force of the second restoring spring 52b. In this way, the second passage of the thermostatic valve 30 is opened and the coolant flows from the return line 20 out of the second outlet connection 34b to the bypass line 28.

Figure 8A:
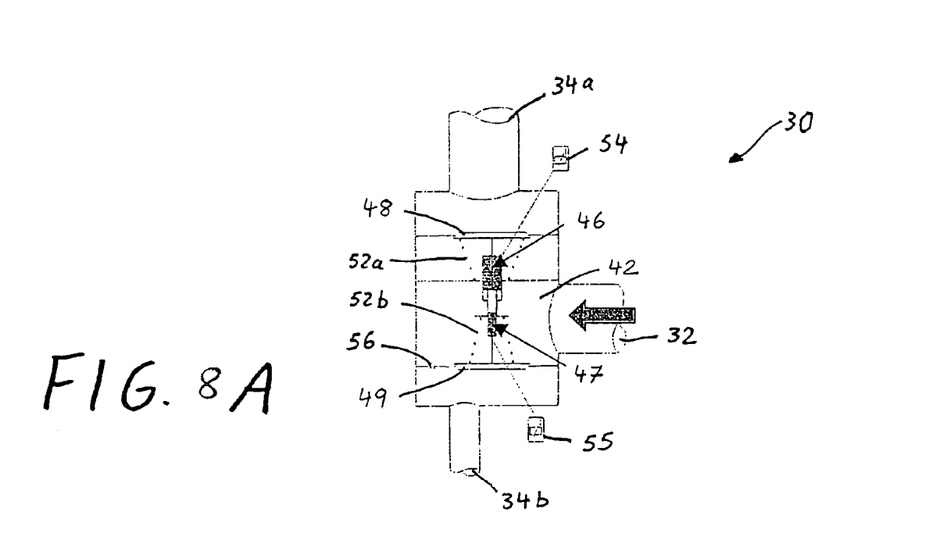
FIGS. 8A to 8D show four different switched states of a fifth exemplary embodiment of a thermostatic valve with two valve disks and two wax cartridge thermostats on a common axis according to the present invention.
Figure 8B:
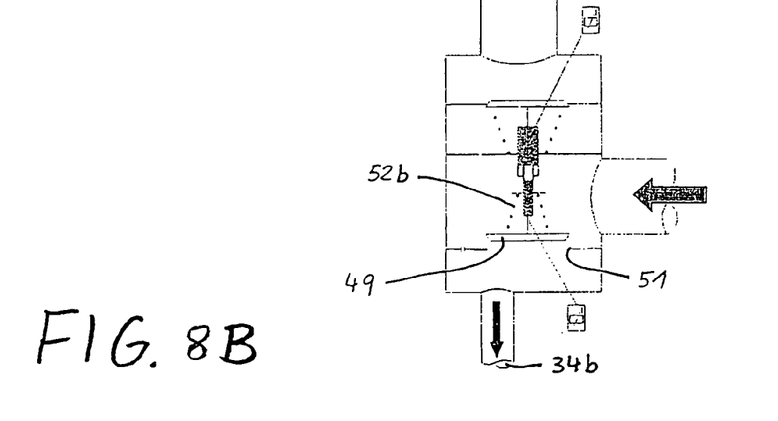
Figure 8C:
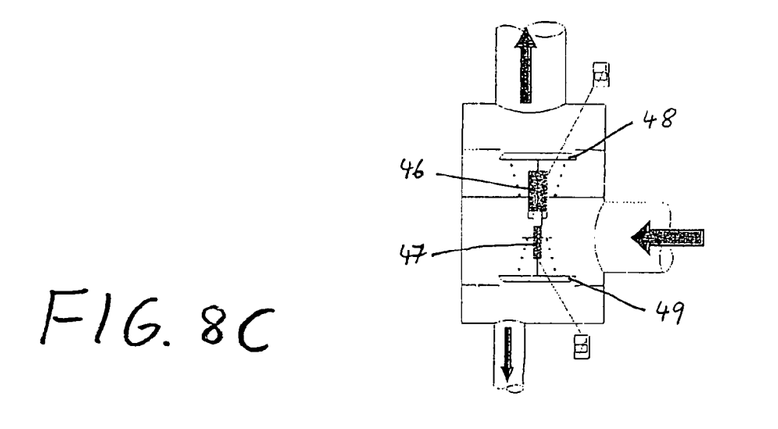
Figure 8D:
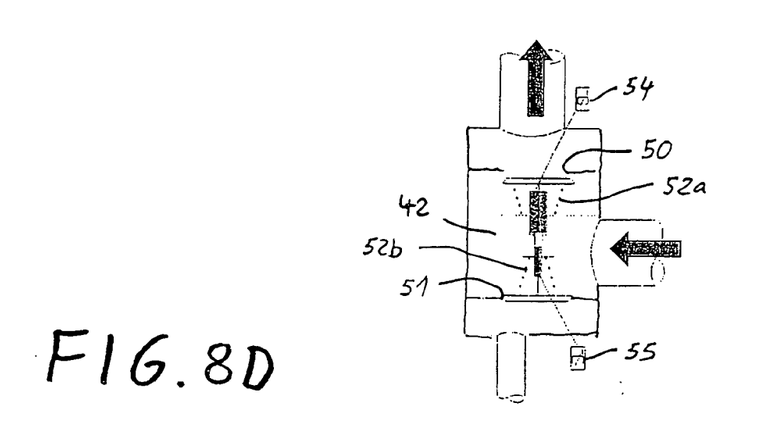

In FIG. 8C, if a higher coolant temperature $T_y$ is reached or if the electric heating elements 54, 55 are activated the thermostatic valve then changes into the mixed operating mode as soon as a coolant temperature $T_y$–$T_2$ is reached. In the third temperature range $T_y < T < T_z$, the wax is expanded further to varying degrees in such a way that the activation elements of the two wax cartridge thermostats 46, 47 act on the valve elements 48, 49 in such a way, and the axial position of the two wax cartridge thermostats 46, 47 in the valve chamber 42 is changed in such a way, that the first valve disk 48 is pulled away from the first passage opening 50 counter to the force of the first restoring spring 52a, so as to open said passage opening 50, but the second wax cartridge thermostat 47 can still hold the second valve disk 49 open counter to the force of the second restoring spring 52b. In this way, both the first passage and the second passage of the thermostatic valve 30 are open and the coolant can flow from the return line 20 to the bypass line 28 and also to the radiator line 22. If a coolant temperature $T_z$ is reached or if the electric heating elements 54, 55 are activated, the thermostatic valve 30 changes into the radiator operating mode in FIG. 8D as soon as a coolant temperature $T_z$–$T_3$ is reached. In the fourth temperature range $T > T_z$, the wax is expanded to varying degrees in such a way that the activation elements of the two wax cartridge thermostats 46, 47 act on the valve elements 48, 49 in such a way, and the axial position of the two wax cartridge thermostats 46, 47 in the valve chamber 42 is changed in such a way, that the first valve disk 48 is pulled away further from the first passage opening 50 and the second wax cartridge thermostat 47 can no longer pull the second valve disk 49 away from the second passage opening 51 counter to the force of the second restoring spring 52b. Therefore, the coolant then flows from the return line 20 exclusively into the radiator line 22 to the radiator 24.

In a further exemplary embodiment of the invention which is explained with reference to FIGS. 9A to 9D, a two-axis arrangement of the components of the thermostatic valve 30 is selected again.

The thermostatic valve 30 illustrated in FIG. 9 contains a total of three valve disks 56–58 which open and close three associated passage openings 60–62, as well as two wax cartridge thermostats 64, 66 with two associated electric heating elements 54, 55.

The first valve element is formed in this case by the first valve disk 56 and the second valve disk 57, the second valve element is formed by the first valve disk 56 and the third valve disk 58, the first passage from the inlet connection 32 to the first outlet connection 34a is formed by the first passage opening 60, the valve chamber 42 and the second passage opening 61, and the second passage from the inlet connection 32 to the second outlet connection 34b is formed by the first passage opening 60, the valve chamber 42 and the third passage opening 62.

The first wax cartridge thermostat 64 acts exclusively on the first valve disk 60' which is biased into its closed position by a first restoring spring 68, and is coupled to a first electric heating element 54. The second wax cartridge thermostat 66 is arranged between the second and third valve disks 57, 58 and acts on them in an interaction with a second restoring spring 69 which biases the second valve disk 57 into its closed position, and a third restoring spring 70 which biases the third valve disk 58 into its closed position, in opposite ways, as described below.

The bypass passage 56 is provided between the inlet connection 32 and the valve chamber 42 in order to bypass the first passage opening 60.

Figure 9A:
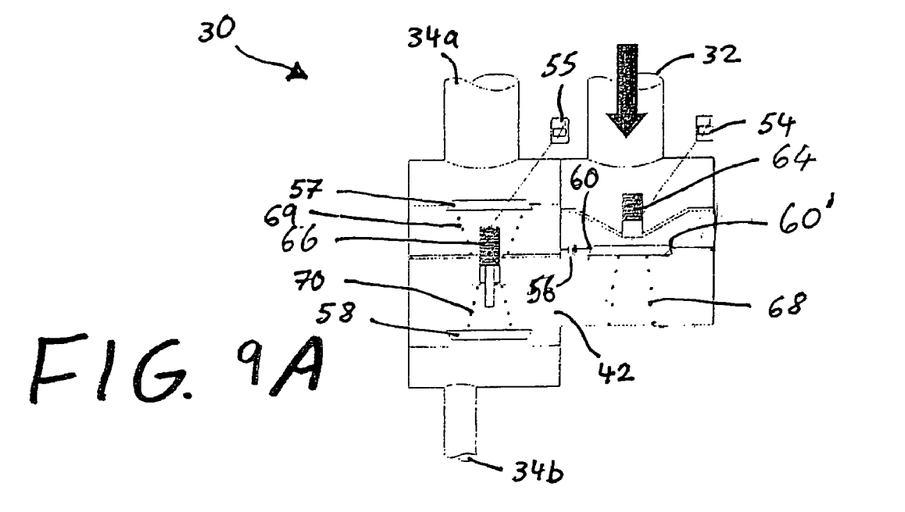
FIGS. 9A to 9D show four different switched states of a sixth exemplary embodiment of a thermostatic valve with three valve disks and two wax cartridge thermostats on two different axes according to the present invention.

In the first temperature range $T < T_x$, the thermostatic valve 30 is in the switched state of full throttling which is illustrated in FIG. 9A. In this switched state, the two wax cartridge thermostats 64 and 66 act on the valve elements, in an interaction with the restoring springs 68, 69 and 70, in such a way that the first valve disk 60' is pressed against the first passage opening 60 by the force of the first restoring spring 68, the second valve disk 57 is pressed against the second passage opening 61 by the force of the second restoring spring 69, and the third valve disk 58 is pressed against the third passage opening 62 by the force of the third restoring spring 70, with the result that the first and second passages are closed.

Figure 9B:
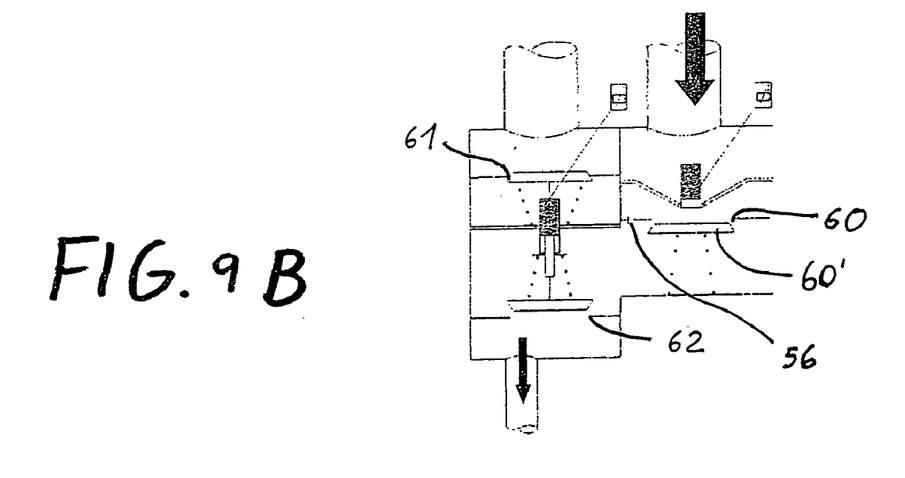

If a coolant's temperature $T_x$ is reached or if the electric heating elements 54, 55 are activated, the system changes to the switched state of the bypass operating mode, illustrated in FIG. 9B, as soon as a coolant temperature $T_x$–$T_1$ is reached. In the second temperature range $T_x<T<T_y$, the wax is expanded to varying degrees in such a way that the activation elements of the two wax cartridge thermostats 64, 66 act on the valve disks 56–58 in such a way that the first valve disk 60' is pressed away from the first passage opening 60 counter to the force of the first restoring spring 68, and the third valve disk 58 is pulled away from the third passage opening 62 counter to the force of the third restoring spring 70. As a result the second passage is opened but the force of the second wax cartridge thermostat 66 on the second valve disk 57 is not yet sufficient to open the second passage opening 61 counter to the force of the second restoring spring 69. Consequently, the first passage leading to the radiator line 22 remains closed.

Figure 9C:
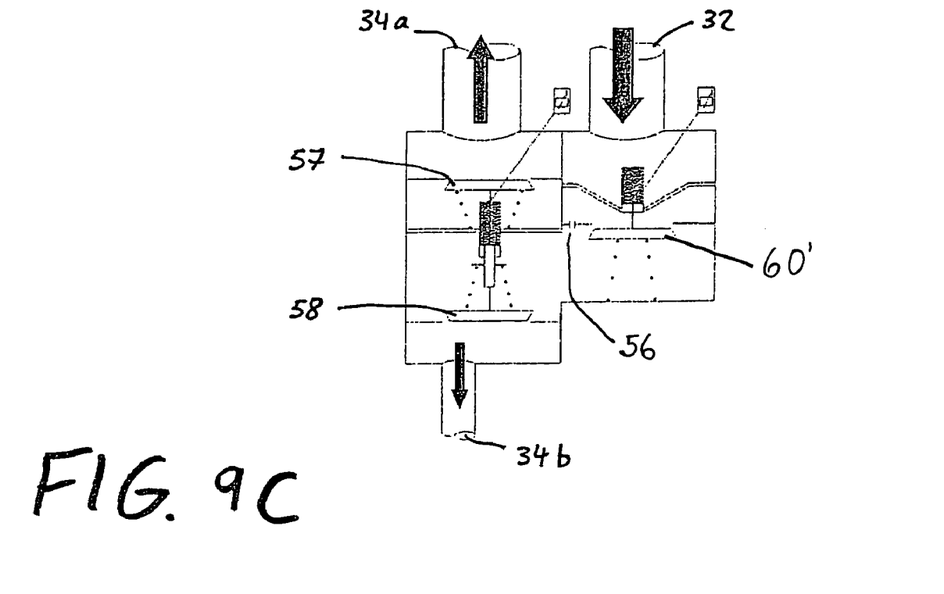

If the coolant temperature $T_y$ is reached or if the electric heating elements 54, 55 are activated, the thermostatic valve 30 changes into the mixed operating mode shown in FIG. 9C as soon as a coolant temperature $T_y$–$T_2$ is reached. In the third temperature range $T_y<T<T_z$, the wax is further expanded to differing degrees in such a way that the first valve disk 60' remains pushed away from the first passage opening 60 by the first wax cartridge thermostat 64 counter to the force of the first restoring spring 68, and that the second wax cartridge thermostat 66 pulls away the second valve disk 57 from the second passage opening 61 and the third valve disk 58 from the third passage opening 62 counter to the forces of the second and third restoring springs 69, 70. In this way, both the first and second passages of the thermostatic valve 30 are opened and the coolant can flow from the return line 20 out of the second outlet connection 34b to the bypass line 28 and also out of the first outlet connection 34a to the radiator line 22.

Figure 9D:
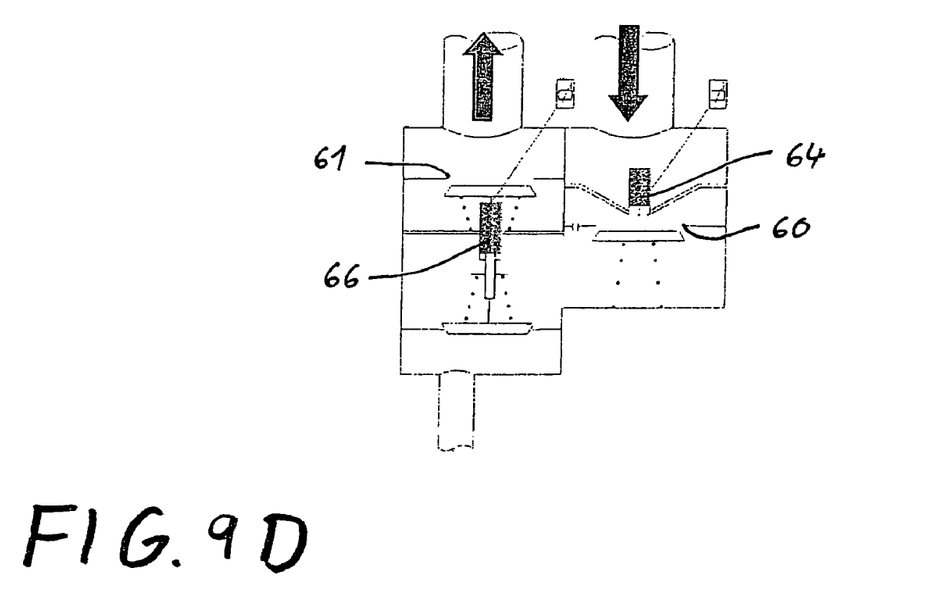

If an even higher coolant temperature $T_y$ is reached or if the electric heating elements 54, 55 are activated, the thermostatic valve 30 changes into the switched state of the radiator operating mode in FIG. 9D for a maximum cooling capacity of the coolant circuit 10, as soon as a coolant temperature $T_z$–$T_3$ is reached. In the fourth temperature range $T>T_z$, the wax is expanded to various degrees in such a way that the activation elements of the two wax cartridge thermostats 64, 66 act on the valve elements in such a way that the first valve disk 60' continues to be pushed away from the first passage opening 50a counter to the force of the first restoring spring 68, and that the second valve disk 57 is pulled away from the second passage opening 61 counter to the force of the second restoring spring 69. However, the force of the second wax cartridge thermostat 66 on the third valve disk 58 is no longer sufficient to open the third passage opening 62 counter to the force of the third restoring spring 70. As a result, the first passage to the radiator line 22 remains open but the second passage to the bypass line 28 is closed.

All the exemplary embodiments described above have in common the fact that the switching times can be advanced or the switching process of the thermostatic valve can operate at a lower coolant temperature as a result of selective control of the electric heating elements which are coupled to the wax cartridge thermostats. In this way, the coolant temperature can be controlled in an optimum way at any time.

The present invention makes use of the advantages of wax cartridge thermostats in order to construct a cost-effective thermostatic valve of a relatively small size and a relatively low weight, and at the same time ensures the advantages provided by a rotary slide thermostatic valve that is the implementation of full throttling and of faster switching times than with a conventional thermostatic valve.

What is claimed is:

1. A thermostatic valve (30) for a cooling system of an internal combustion engine, having an inlet connection (32) for communication with a coolant return line (20) from an internal combustion engine (12);
   a first outlet connection (34a) for communication with a coolant radiator line (22) leading to a radiator (24);
   a second outlet connection (34b) for communication with a coolant bypass line (28) leading to the internal combustion engine;
   a first valve element (48; 60', 57) for closing and opening a first passage between the inlet connection and the first outlet connection; and a second valve element (49; 60', 58) for closing and opening a second passage between the inlet connection and the second outlet connection, and at least two wax cartridge thermostats (46, 47; 64, 66) for activating the valve elements (48, 49; 60', 57, 58), at least one of the wax cartridge thermostat (46, 47; 64, 66) being connected to an electric heating element (54, 55) in order to influence the temperature acting on the respective wax cartridge thermostat, and the thermostatic valve (30) also including a coolant bypass passage (56) between the inlet connection (32) and the second outlet connection (34b) leading to the coolant bypass line (28).

2. The thermostatic valve as claimed in claim 1, wherein a first and a second wax cartridge thermostat (46, 47) are provided which contain wax materials with different temperature coefficients.

3. The thermostatic valve as claimed in claim 2, wherein the first wax cartridge thermostat (46) acts on the first valve element (48), and the second wax cartridge thermostat (47) acts on the second valve element (49), the first and second wax cartridge thermostats operating independently of one another.

4. The thermostatic valve as claimed in claim 2, wherein the first valve element (48) is composed of a first valve disk for opening and closing the first passage, and the second valve element (49) is composed of a second valve disk (49a) and a third valve disk (49b) which close and open the second passage alternately, wherein the first wax cartridge thermostat (46) is arranged between the first valve disk and the second valve disk (48, 49a), and the second wax cartridge thermostat (47) is arranged between the second and third valve disks (49a, 49b).

5. The thermostatic valve as claimed in claim 1, wherein the electric heating element (54, 55) can be controlled as a function of at least one parameter which represents the load of the internal combustion engine (12).

6. The thermostatic valve as claimed in claim 1, wherein the first and second valve elements (48, 49; 60', 57, 58) are biased, by means of restoring springs (52a, 52b; 68, 69, 70), into their position which closes the first passage and the second passage, respectively.

7. The thermostatic valve as claimed in claim 1, wherein the first and second valve elements (48, 49) are arranged on a common axis.

8. A cooling system for an internal combustion engine, having a thermostatic valve (30) as claimed in claim 1.

9. A thermostatic valve for a cooling system of an internal combustion engine, having an inlet connection (32) for communication with a coolant return line (20) from an internal combustion engine (12);
    a first outlet connection (34*a*) for communication with a coolant radiator line (22) leading to a radiator (24);
    a second outlet connection (34*b*) for communication with a coolant bypass line (28) leading to the internal combustion engine;
    a first valve element (48; 60', 57) for closing and opening a first passage between the inlet connection and the first outlet connection; and a second valve element (49; 60', 58) for closing and opening a second passage between the inlet connection and the second outlet connection, wherein at least one wax cartridge thermostat (46, 47; 64, 66) is provided for activating the valve elements (48, 49; 60', 57, 58), and wherein a wax cartridge thermostat (46, 47; 64, 66) is connected to an electric heating element (54, 55) in order to influence the temperature acting on a wax cartridge thermostat, the first valve element (48) being composed of a first valve disk for opening and closing the first passage, and the second valve element (49) being composed of a second valve disk (49*a*) and a third valve disk (49*b*) for closing and opening the second passage alternatively, at least one wax cartridge thermostat (46) being arranged between the first valve disk and the second valve disk (48, 49*a*), and the thermostatic valve (30) being also provided with a coolant bypass passage (56) between the inlet connection (32) and the second outlet connection (34*b*) leading to the coolant bypass line (28).

10. The thermostatic as claimed in claim 9, wherein two wax cartridge thermostats (46, 47; 64, 66) are provided for activating the valve elements (48, 49; 60', 57, 58), one of the two wax cartridge thermostats (46, 47; 64, 66) being connected to an electric heating element (54, 55) in order to influence the temperature acting on the wax cartridge thermostat, said first and a second wax cartridge thermostat containing wax materials with different temperature coefficients.

11. The thermostatic valve as claimed in claim 9, wherein the first valve element (48) is composed of a first valve disk for opening and closing the first passage, and the second valve element (49) is composed of a second valve disk for opening and closing the second passage, the first and second wax cartridge thermostats (46, 47) being arranged one behind the other between the first valve disk and the second valve disk (48, 49).

12. The thermostatic valve as claimed in claim 9, wherein a first heating element (54) is assigned to a first wax cartridge thermostat (46), and a second heating element (55) is assigned to a second wax cartridge thermostat (47).

13. The thermostatic valve as claimed in claim 9, wherein the first wax cartridge thermostat (46) acts on the first valve element (48), and the second wax cartridge thermostat (47) acts on the second valve element (49), and the first and second wax cartridge thermostats are coupled in opposition to one another.

14. The thermostatic valve as claimed in claim 9, wherein the first and second valve elements (48, 49; 60', 57, 58) are arranged on two different axes.

15. The thermostatic valve as claimed in claim 9, wherein the first wax cartridge thermostat (46) acts on the first valve element (48), and the second wax cartridge thermostat (47) acts on the second valve element (49), the first and second wax cartridge thermostats operating independently of one another.

* * * * *